(12) United States Patent
Grosch et al.

(10) Patent No.: US 9,323,823 B2
(45) Date of Patent: Apr. 26, 2016

(54) METHOD FOR OPERATING A REDUNDANT AUTOMATION SYSTEM

(71) Applicants: Thomas Grosch, Roβtal (DE); Jürgen Laforsch, Karlsruhe (DE); Albert Renschler, Ettlingen (DE)

(72) Inventors: Thomas Grosch, Roβtal (DE); Jürgen Laforsch, Karlsruhe (DE); Albert Renschler, Ettlingen (DE)

(73) Assignee: Siemens Aktiengesellschaft, Munich (DE)

( * ) Notice: Subject to any disclaimer, the term of this patent is extended or adjusted under 35 U.S.C. 154(b) by 428 days.

(21) Appl. No.: 13/891,443

(22) Filed: May 10, 2013

(65) Prior Publication Data

US 2013/0318041 A1    Nov. 28, 2013

(30) Foreign Application Priority Data

May 25, 2012   (EP) .................................. 12169553

(51) Int. Cl.
*G06F 17/30* (2006.01)
*G05B 9/03* (2006.01)
*G05B 19/05* (2006.01)

(52) U.S. Cl.
CPC ............ *G06F 17/30581* (2013.01); *G05B 9/03* (2013.01); *G05B 19/058* (2013.01)

(58) Field of Classification Search
USPC ......... 700/1–2, 18, 21, 28, 30; 714/12; 710/8, 710/10
See application file for complete search history.

(56) References Cited

U.S. PATENT DOCUMENTS

| | | | | |
|---|---|---|---|---|
| 2005/0027377 A1* | 2/2005 | Lucas | ............. | G05B 19/41845 700/28 |
| 2006/0056285 A1* | 3/2006 | Krajewski, III | .......... | G05B 9/03 370/216 |
| 2006/0100797 A1* | 5/2006 | Poorman | .................. | G01H 1/00 702/56 |
| 2007/0168058 A1 | 7/2007 | Kephart et al. | | |
| 2010/0049717 A1 | 2/2010 | Ryan et al. | | |
| 2010/0293363 A1* | 11/2010 | Meyer | ................ | G05B 19/0426 713/1 |

FOREIGN PATENT DOCUMENTS

GB    2 434 229    7/2007

OTHER PUBLICATIONS

Siemens-Catalogue ST 70, Chapter 6, Edition 2011.

* cited by examiner

*Primary Examiner* — Kidest Bahta
(74) *Attorney, Agent, or Firm* — Cozen O'Connor

(57) ABSTRACT

A method for operating an automation system having at least two subsystems which are each provided with a control program, wherein relevant data from one subsystem is transmitted to the other subsystem within the scope of an updating phase of the automation system to transfer process control from a solo mode of one of the subsystems to a redundant control mode with another of the subsystems so as to facilitate updating.

4 Claims, 4 Drawing Sheets

METHOD FOR OPERATING A REDUNDANT AUTOMATION SYSTEM

BACKGROUND OF THE INVENTION

1. Field of the Invention

The invention relates to a method for operating an automation system having at least two subsystems which are each provided with a control program, where relevant data from one subsystem is transmitted to the other subsystem within the scope of an updating phase of the automation system to transfer process control from a solo mode of one of the subsystems to a redundant control mode with another of the subsystems. In addition, the invention relates to a redundant automation system which is configured to perform the method.

2. Description of the Related Art

In the automation environment, there is an increasing demand for highly available solutions (H systems) that are suitable for minimizing possible downtimes for the installation. The development of such highly available solutions is very cost-intensive, where an H system that is usually used in the automation environment is distinguished by the fact that two or more subsystems in the form of automation devices or computer systems are coupled to one another via a synchronization connection. In principle, both subsystems can effect read and/or write access to the peripheral units connected to this H system. One of the two subsystems is the leader with respect to the peripherals connected to the system. This means that outputs to peripheral units or output information for these peripheral units is/are provided only by one of the two subsystems that operates as a master or has assumed the master function. So that both subsystems can run in a synchronous manner, the subsystems are synchronized at regular intervals via the synchronization connection. With respect to the frequency and amount of synchronization, different forms may be distinguished (e.g., warm standby or hot standby).

An H system often requires a smooth "failover" if one of the subsystems fails and it is necessary to change over to the other subsystem, as a result of which this other subsystem undertakes the process control in a solo mode or non-redundant mode. This means that, despite this unplanned changeover or this unplanned change from one subsystem to the other, this changeover or change does not have a disruptive effect on the technical process to be controlled or the process control. Here, it is permissible for a (short) dead time to occur at the outputs of the connected peripherals during which the outputs remain at their last valid process output values. However, a jump (i.e., a surge) in the values at these outputs on account of the changeover is undesirable and should therefore be avoided. Consequently, "smooth" should also be understood as meaning the continuity of the curve shape of the process output values.

In order to achieve this smoothness, the two subsystems must have the same system state at the time of the failure. This is ensured by a suitable synchronization method. If both subsystems are processing the input information (inputs) of the process, both systems are in the same system state when they change their respective "thread global" data (shared data of programs, i.e., programs with different priorities) in the same manner (given the same process input data or process input information). In order to achieve this, the synchronization method ensures that the individual threads of the two subsystems are interrupted or executed in the same manner. This results in an identical "thread mountain".

In addition, it must also be ensured, when transferring the process control from a solo or non-redundant mode to a redundant mode, for example, after a failed subsystem has been replaced, that this transfer or this transition is effected smoothly. During such a transfer, it is necessary to transmit relevant data from the previously process-controlling subsystem to the newly or additionally connected subsystem. During this transfer, which is referred to as coupling and updating, during a coupling and updating phase, the technical process to be controlled or the process control must not be influenced in a disruptive manner and the process control must continue to run without disruption during this coupling and updating phase, i.e., the updating phase below for purposes of simplicity.

Siemens catalog ST 70, chapter 6, 2011 edition, discloses a redundant automation system that consists of two subsystems and is intended to increase the availability of an installation to be controlled. Updating is effected such that data are gradually transmitted, where a check is initially performed to determine whether a value of the subsystem operated in the solo mode, which is stored in a data area, differs from a value to be newly written. If these values differ, a "dirty bit" is set, which indicates that the data from this data area must be transmitted to the further subsystem. If all the data have been transmitted, the automation system operates in the redundant mode. If the data from this data area represent highly dynamic data, the disadvantage is that the transition is not effected smoothly at the end of the updating phase ("update surge") because the subsystem operating in the solo mode must be stopped and the process control must be briefly stopped.

SUMMARY OF THE INVENTION

It is therefore an object of the invention to provide a method that is used to facilitate updating. It is also an object to provide a redundant automation system which is configured to implement the method.

These and other objects and advantages are achieved in accordance with the invention by a method and automation system by which it is advantageously possible to dispense with a complicated "dirty bit mechanism". At the beginning of the updating phase, the subsystem operating in the solo mode (i.e., the master below) creates a copy of its relevant data representing the internal state of the master at the beginning of this updating phase, where the data are transmitted to the subsystem "to be updated" or the newly connected subsystem (i.e., the slave or reserve) in fragmented form. This internal state is substantially determined or predefined by static and dynamic data, data modules, process input and output values and configuration data. The slave is finally brought to the internal state of the master gradually and in a temporally asynchronous manner with respect to the current processing of the control program by the master using the releases, where the slave begins to process the releases only when it has completely received the copy. The slave executes the same program paths, which have already been executed by the master, with a time delay using the relevant data in accordance with the releases. This means that the master leads the slave in terms of time or the slave lags the master in terms of time with regard to the program processing. In this context, a "lag" or "lead" is understood as meaning the time difference between the beginning of the processing of the processing sections by the master and the beginning of the processing of the corresponding processing sections by the slave, which corresponds to the time at which the release or release signal occurs. It should also be noted that a program is understood as meaning both a program as such and a subroutine, a part of a program, a task, a thread, an organizational module, a functional module or another suitable program code for implementing an automation function, where the programs of an automation system are usually categorized into priority classes and are processed or executed according to their associated priority.

At the time at which the slave has made up for the lag or backlog or this lag is below a predefinable or predefined period of time considered to be non-critical or is below a tolerable amount, the updating phase is completed and the automation system operates in a redundant operating mode from this time onward. With regard to the process control, the master is therefore transferred from the solo mode to a redundant mode with the slave or reserve, where the master and the slave execute the same program paths, preferably in a temporally asynchronous manner, from this time onward on account of an event, for example, in the form of a process alarm.

With regard to such temporally asynchronous passes through the program paths, reference is made to the earlier European patent application 12166006.2, the entire disclosure content of which is hereby incorporated by reference in its entirety.

It should be understood that the automation system can also be configured such that the program paths are processed in a temporally synchronous manner after the updating phase or after updating.

On account of the temporally asynchronous communication between the master and the slave during the updating phase, it is also possible to use slow communication connections. This means that it is also possible to provide a communication connection that is poor per se with regard to the transmission bandwidth or response time or else a communication connection that is also used by other communication subscribers and is thus not exclusively available for the coupling and updating operation. It is therefore possible to dispense with a separate synchronization connection. Furthermore, large distances between the two subsystems may also be overcome without overly impairing the system performance as a result of long signal propagation times or long latencies.

In an embodiment of the invention, the process input values are transmitted to the other subsystem together with the releases. The information relevant to the other subsystem is initially combined or collected and is finally transmitted to the other subsystem. This reduces the "management outlay" for both subsystems.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention, its refinements and advantages are explained in more detail below using the drawing, which illustrates an exemplary embodiment of the invention and in which.

DETAILED DESCRIPTION OF THE PREFERRED EMBODIMENTS

Figure 1:
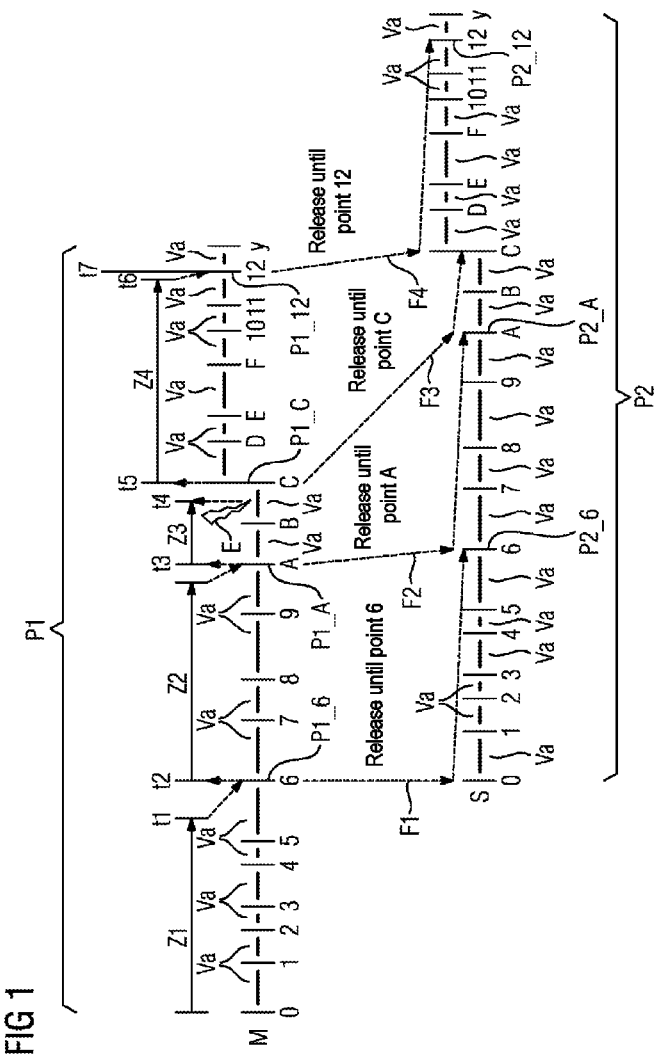
FIG. 1 shows a sequence of temporally asynchronous coupling of two subsystems in accordance with the invention.
Figure 2:
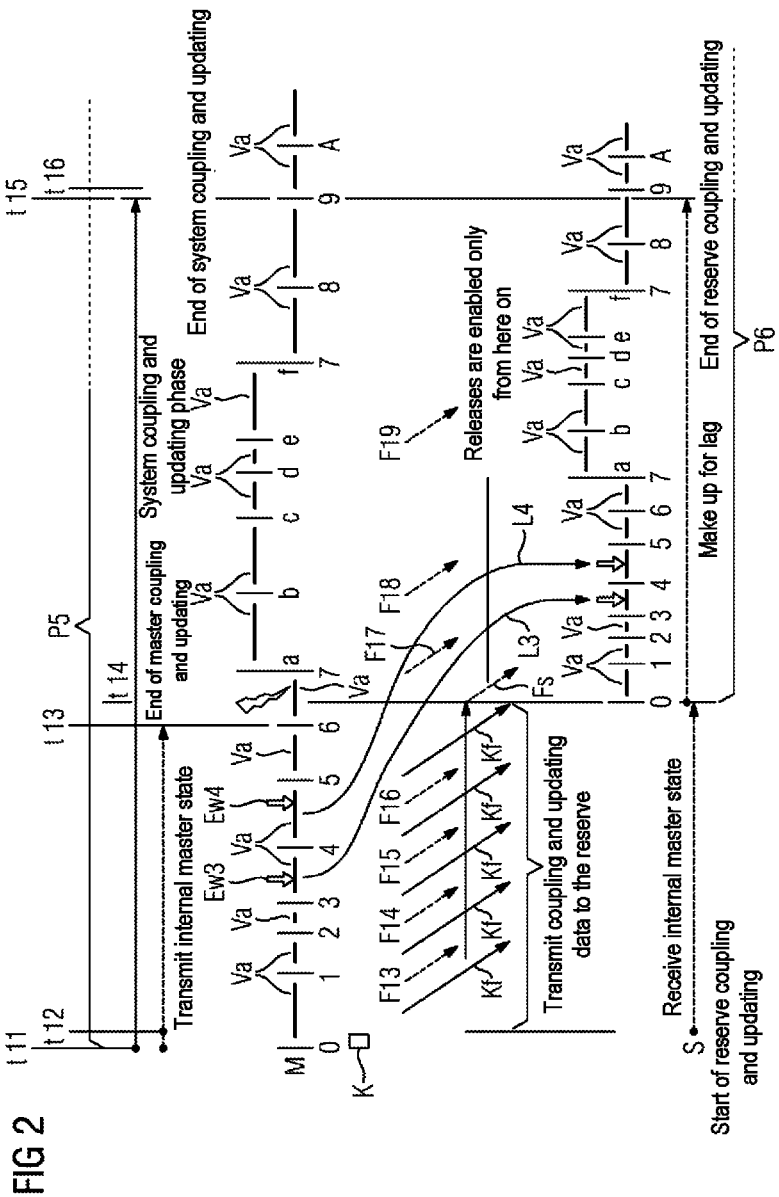
FIG. 2 shows an updating sequence in accordance with the invention.
Figure 3:
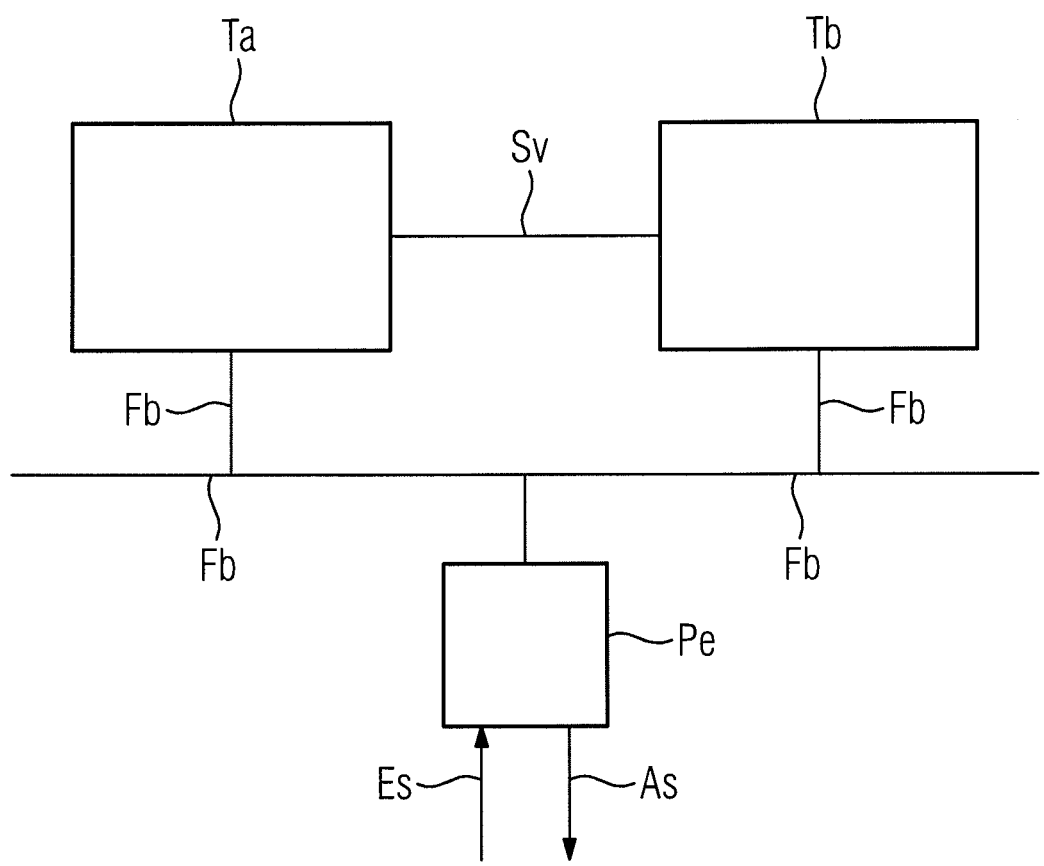
FIG. 3 shows a conventional redundant automation system.

The same parts in FIGS. 1 to 3 are provided with the same reference symbols.

Reference is initially made to FIG. 3, which illustrates a redundant automation system which is known per se and which comprises two subsystems. A first subsystem Ta and a second subsystem Tb are connected to a peripheral unit Pe via a field bus Fb. In this case, the field bus Fb complies with the PROFIBUS-DP specification, for example. In principle, other bus systems, such as Ethernet, Fieldbus, Modbus, ProfiNet IO or else parallel bus systems, are also suitable. The peripheral unit Pe receives, via input lines Es, signals from transducers or measuring transducers, which are used to detect a process state, and outputs, via output lines As, signals to actuators which are used to influence the process. The process as well as the transducers, measuring transducers and actuators are not illustrated in the figure for the sake of clarity. The two subsystems Ta, Tb execute the same control program in a cyclical and synchronous manner. A synchronization connection Sv is provided to synchronize the subsystems, where the redundancy and monitoring functions are implemented via this synchronization connection Sv.

As explained above, from a time at which an updating phase is complete, the automation system operates in a redundant operating mode and, with regard to the process control, one subsystem is transferred from the solo mode to the redundant mode with a further subsystem. From this time on, both subsystems execute the same program paths in an event-synchronous manner, for example, on account of an event in the form of a process alarm, the pass using the master and the pass using the slave preferably having been effected in a temporally asynchronous manner.

In order to explain event-synchronous processing of the control programs and for better understanding of the invention, reference is made below to FIG. 1, which illustrates a sequence of temporally asynchronous coupling of two subsystems, as proposed in the earlier European patent application 12166006.2. In this context, "event-synchronous processing" means that both the master and the slave execute the same program paths of the respective control program on account of an event, where the passes are effected in a temporally asynchronous manner.

It is assumed that one subsystem is operated as a master M and one subsystem is operated as a slave S or a reserve. The master M is therefore the leader with respect to the control of a technical process and undertakes the process control, the master reading the process input information or process input values from the peripheral unit Pe (FIG. 3) and making it/them available to the slave S in a temporally asynchronous manner. The slave S assumes the master function or the role of master only if the master M fails on account of a fault.

The master M processes a program P1 for controlling the technical process, the slave S also processing a program P2 corresponding to this control program P1. Both control programs P1, P2 have a multiplicity of processing sections (Va) of different duration, where the control programs P1, P2 are able to be interrupted at the respective beginning and the respective end of each processing section Va. The beginning and end of each processing section Va, which usually comprises a multiplicity of program codes, therefore represent interruptible program points or breakpoints 0, 1, 2, . . . y. If necessary, the respective control program P1, P2 can be interrupted at these points 0, 1, 2, . . . y using the master M and the slave S to be able to initiate suitable reactions after an event or a process alarm has occurred. Furthermore, the respective control program P1, P2 can be interrupted at these breakpoints 0, 1, 2, . . . y so that the master M and the slave S can interchange releases, acknowledgements or other information via the field bus Fb or via the synchronization connection Sv (FIG. 3). After a respective predefinable or predefined interval of time Zi (i=1, 2, . . . n) has expired and at the respective time at which a breakpoint following the expiry of the respective interval of time Zi occurs, preferably the first breakpoint following the respective interval of time Zi, the master M transmits a release or release signal to the slave S, which release or release signal indicates to the slave S the processing section Va up to which the slave S can process the control program P2. These processing sections Va of the control program P2 correspond to those that have already been processed by the master M during the processing of the control program P1. In the present exemplary embodiment, it is assumed that, after an interval of time Z1 has expired, the master M transmits a release F1 to the slave S at a time t1 and at a time t2 at which a first breakpoint P1_6 (breakpoint 6) follows the interval of time Z1. This release F1 comprises the information for the slave S indicating that the slaves can process its control program P2 to be processed up to a breakpoint P2_6 (breakpoint 6), where the breakpoint P2_6 of the control program P2 corresponds to the breakpoint P1_6 of the control program P1. This means that, based on the release, the slave S can process those processing sections Va of the control program P2 that correspond to the processing sections Va of the control program P1 up to the time at which the release or the release signal is generated, in which case it is assumed in the example, for the sake of simplicity, that the time at which the release is generated corresponds to the time at which the release is transmitted to the slave S. These processing sections Va are therefore processed using the slave S in a temporally asynchronous manner with respect to the processing of the corresponding processing sections Va using the master M, the slave S processing further processing sections Va, after the processing sections Va of the control program P2 have been processed by the slave S, only when the master M transmits a further release to the slave S. The time at which this breakpoint P1_6, P2_6 (breakpoint 6) occurs represents the beginning of an interval of time Z2 following the interval of time Z1.

The further temporally asynchronous processing of the control programs P1, P2 is performed in the described manner. At a time t3 at which a first breakpoint P1_A occurs after the expiry of the interval of time Z2, the master M transmits a further release F2 to the slave S, which release indicates to the slave S that the slaves can process further processing sections Va up to the breakpoint P2_A. These processing sections Va again correspond to those that have already been processed by the master M from the time t2 to the time t3, i.e., up to the breakpoint P1_A. This means that the slave S processes the processing sections Va from the time t2 of the previous release F1 to the time t3 of the current release F2. The time t3 at which the first breakpoint P1 A has occurred after the expiry of the interval of time Z2 is the beginning of an interval of time Z3 following the interval of time Z2.

An event, for example, an event in the form of a process alarm, may now occur during an interval of time. In the exemplary embodiment, E is used to denote such an event to which the master M must react in a suitable manner during the interval of time Z3 at a time t4 in accordance with the control program P1. In this case, the master M transmits a release F3 to the slave S not at a time at which a breakpoint following the interval of time Z3 occurs after the interval of time Z3 but rather at a time t5 at which a breakpoint P1_C (breakpoint C) following the occurrence of the event E occurs. This means that the interval of time Z3 is shortened on account of the event E, where the time t5 is the beginning of a following interval of time Z4. Based on the release F3 transmitted to the slave S, the slave S processes those processing sections Va of the control program P2 that correspond to those processing sections Va of the control program P1 that have already been processed by the master M between the times t3 and t5.

On account of the event E, the master M processes higher-priority processing sections Va during the interval of time Z4, for example, the master M performs a thread change at the time t5, and, after the interval of time Z4 has expired at the time t6, again transmits a release F4 at a time t7 at which a first breakpoint P1_12 (breakpoint 12) following the interval of time Z4 occurs. Based on this release, the slave S likewise processes processing sections Va up to a breakpoint P2_12 (breakpoint 12) in the control program P2, where these processing sections Va correspond to the processing sections Va of the control program P1 between the times t5 and t7, and the slave S likewise performs a thread change.

As previously explained, the releases from the master M make it possible for the slave S to run through the same "thread mountain" as the master M, which means that the slave S performs a "thread change" at a point in the control program P2 corresponding to the point in the control program P1. The slave S continues its processing only when requested to do so by the master M via a release. With regard to the processing of the processing sections, the master M processes them in real time like in a stand-alone mode or in a non-redundant mode and issues releases for corresponding processing sections to be processed by the slave S at regular intervals of time and after the occurrence of events. Here, the master M continues to process its control program P1 and not does actively wait for a response from the slave S. With regard to the processing of the corresponding processing sections, the slave S lags the master M and processes the sections based on the issued master releases.

It is assumed below that the process control needs to be transferred from a solo mode of the master M to a redundant control mode with the slave S. Such a transfer is necessary, for example, when the slave S is coupled to the master M again following a repair. In this respect, reference is made to FIG. 2, which illustrates an updating sequence of the automation system.

This transfer begins at a time t11 by which the master M has recognized that the slave S is coupled to the field bus Fb (FIG. 3), where the updating phase both of the master M and of the slave S begins from this time t11 on. From this time t11 on, the master M creates a local copy K of all relevant data representing its internal state up to this time t11, where the master M still controls the technical process in the solo mode and processes processing sections Va of a control program P5. From a time t12 to a time t13, at which the updating phase of the master M is complete, the master M transmits this copy K to the slave S in fragmented form (indicated in the drawing using arrows Kf), where the copy K has been completely received by the slave S by a time t14. At this time t14, the slave S now has the same internal state as the master at the time t11. From the time t12 on, all releases from the master M and all process input values read in from the peripheral unit Pe (FIG. 3) by the master M are also buffered on the master M, the slave S or a further subsystem of the automation system, where these releases for processing by the slave S are enabled only after the copy K has been completely received. In the present exemplary embodiment, it is assumed that the master M running in the solo mode has produced releases F13, F14, F15, F16 and has also read in process input values Ew3, Ew4 during a period of time from the time t11 to the time t13 at which the transmission of the copy K is complete. These releases F13 to F16 and these process input values Ew3, Ew4 are enabled for the slave S only from a time t14 on, i.e., at the time at which the slave S has been completely provided with the internal state of the master M, which is indicated in the figure via an arrow Fs and curved lines L3, L4. After this enabling by the master M, the slave S approaches the internal state of the master M by virtue of the slave S processing the data in the copy K in accordance with the releases F13 to F16. Here, the slave S processes the processing sections Va of its control program P6 that correspond to the processing sections Va of the control program P5 of the master M until the time t13, where the slave S takes into account the process input values Ew3, Ew4 with regard to the processing of the control program P6.

On account of the fact that the slave S approaches the internal state of the master M in a temporally asynchronous manner, the slave S lags the master M with regard to the processing of the corresponding processing sections Va of the control program P6, this time lag having to be reduced to a tolerable amount; this is because a time lag which is too high may result in a loss of redundancy. In order to reduce this time lag, provision is made for the processing speed of the slave S to be higher than the processing speed of the master M, which is illustrated in the figure as "shortened" processing sections Va in the control program P6. This relative increase in the processing speed of the slave S can be effected, for example, by virtue of the slave S processing the processing sections Va of its program P6 more quickly or by virtue of the master M processing the processing sections Va of its program P5 more slowly. The updating phase of the slave S and thus of the automation system, which begins at the time t12, is complete only when the lag is made up for or is reduced to a tolerable amount or a predefined value. In the present exemplary embodiment, it is assumed that the lag has been reduced to a tolerable amount at a time t15. This amount is selected or predefined such that, if the master M fails, the slave S can assume the role of master smoothly. In the figure, the time difference between a time t16 and the time t15 represents the tolerable amount, which is approximately 20 milliseconds in a practical exemplary embodiment of the invention. Within the scope of the updating phase of the slave S, the slave S processes, from the time t14 to the time t15, both the releases F13 to F16 buffered during the transmission of the copy K and releases F17, F18, F19 transmitted by the master M to the slave S after this transmission. These releases F17 to F19 indicate to the slave S which processing sections Va of the control program P6 also need to be processed by the slave S, where these processing sections Va correspond to the processing sections Va of the control program P5 that have already been processed by the master M from the time t14 on. In other words, after the master M has completely transmitted the copy to the slave S or the slave S has completely received this copy K, the slave S processes, from the time t14 to the time t16, all released processing sections Va of its control program P6 which correspond to those which have already been processed by the master M from the time t11 to the time t15.

From the time t15 on, the updating phase is complete and the automation system has been transferred to a redundant mode. The process control has changed from the solo mode of the master M to the redundant mode with the slave S, where the further passes through the corresponding program paths on the master M and the slave S can be performed in the described manner from the time t16 on in a temporally asynchronous manner or else in a temporally synchronous manner in a manner known per se.

Figure 4:
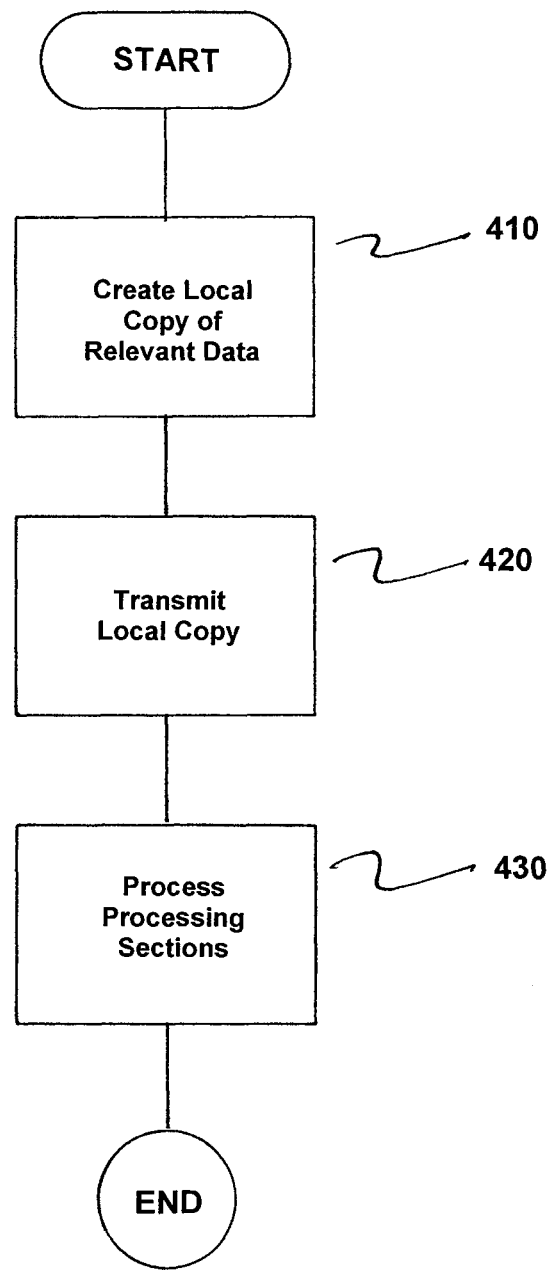
FIG. 4 is a flowchart of the method in accordance with the invention.

FIG. 4 is a flowchart of a method for operating an automation system having a plurality of subsystems which are each provided with a control program, where relevant data from the one subsystem is transmitted from one subsystem of the plurality of subsystems to another subsystem of the plurality of subsystems during an updating phase of the automation system so as to transfer process control from a solo mode of the one subsystem of the plurality of subsystems to a redundant control mode with the other subsystem of the plurality of subsystems.

The method comprises creating, by the one subsystem, a local copy of its relevant data at a beginning of the updating phase, as indicated in step 410.

Next, the local copy of the relevant data is transmitted by the one subsystem during the updating phase to the other subsystem in fragmented form, and process input values and releases from the one subsystem are buffered, as indicated in step 420. Here, the releases indicate which processing sections of the control program have already been processed by the one subsystem.

After the copy has been transmitted, processing sections of the control program of the other subsystem which correspond to the processing sections of the control program of the one subsystem with a time lag are processed using the other subsystem taking into account the buffered process input values, as indicated in step 430. Here, the processing sections of the control program is processed at a greater rate than the processing of the processing sections of the control program to reduce the processing time lag to a predefined value.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating an automation system having a plurality of subsystems which are each provided with a control program, a processor and memory, relevant data from the one subsystem being transmitted from one subsystem of the plurality of subsystems to another subsystem of the plurality of subsystems during an updating phase of the automation system to transfer process control from a solo mode of the one subsystem of the plurality of subsystems to a redundant control mode with the other subsystem of the plurality of subsystems, the method comprising:

creating, by the one subsystem, a local copy of its relevant data at a beginning of the updating phase;

transmitting, by the one subsystem during the updating phase, the local copy of the relevant data to the other subsystem in fragmented form, and buffering process input values and releases from the one subsystem, the releases indicating which processing sections of the control program have already been processed by the one subsystem during execution by the processor;

processing, after the copy has been transmitted, processing sections of the control program of the other subsystem which correspond to the processing sections of the control program of the one subsystem with a time lag using the other subsystem taking into account the buffered process input values such that process control is transferred from the solo mode of the one subsystem of the plurality of subsystems to the redundant control mode with the other subsystem of the plurality of subsystems, the released processing sections of the control program being processed in the processor at a greater rate than the processing of the processing sections of the control program to reduce a processing time lag to a predefined value.

2. The method as claimed in claim 1, wherein the process input values are transmitted to the other subsystem together with the releases.

3. A redundant automation system comprising:

a plurality of subsystems which are each provided with a control program, a processor and memory, one subsystem of the plurality of subsystems transmitting relevant data to another subsystem of the plurality of subsystems during an updating phase to transfer process control from a solo mode of the one subsystem of the plurality of subsystems to a redundant control mode with the subsystems of the plurality of subsystems;

wherein the one subsystem is configured to create a local copy of its relevant data at a beginning of the updating phase;

wherein the one subsystem is further configured to transmit the local copy of the relevant data to the other subsystem in fragmented form during the updating phase;

wherein one of the one subsystem, the other subsystem or a further subsystem of the automation system is configured to buffer process input values and releases from the one subsystem, the releases indicating which processing sections of the control program have already been processed by the one subsystem during execution by the processor; and wherein the other subsystem is configured to process released processing sections of its control program which correspond to the processing sections of the control program of the one subsystem with a time lag taking into account the buffered process input values after the local copy of the relevant data has been received, the automation system being configured to process the released processing sections of the control program in the processor at a greater rate than the processing of the processing sections of the control program to reduce the processing time lag to a predefined value.

4. The redundant automation system as claimed in claim 3, wherein the one subsystem is further configured to transmit the process input values to the other subsystem together with the releases.

* * * * *